United States Patent
Yamada

(10) Patent No.: US 7,636,633 B2
(45) Date of Patent: Dec. 22, 2009

(54) CAR NAVIGATION SYSTEM

(75) Inventor: Yasufumi Yamada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 11/516,505

(22) Filed: Sep. 7, 2006

(65) Prior Publication Data

US 2007/0129884 A1   Jun. 7, 2007

(30) Foreign Application Priority Data

Dec. 7, 2005   (JP)   ............................. 2005-353597

(51) Int. Cl.
*G01C 21/30* (2006.01)
*G01C 21/32* (2006.01)
*B60Q 1/26* (2006.01)
*G08B 5/22* (2006.01)

(52) U.S. Cl. ...................................... 701/209; 340/480

(58) Field of Classification Search ................ 340/439, 340/480, 904, 905, 995.26, 995.27, 999
See application file for complete search history.

(56) References Cited

U.S. PATENT DOCUMENTS

| | | | | |
|---|---|---|---|---|
| 5,475,599 | A * | 12/1995 | Yokoyama et al. | ........... 701/211 |
| 6,157,890 | A * | 12/2000 | Nakai et al. | ................... 701/200 |
| 6,871,720 | B2 * | 3/2005 | Hauer et al. | ................. 180/315 |
| 6,903,652 | B2 * | 6/2005 | Noguchi et al. | ........... 340/425.5 |
| 7,113,077 | B2 * | 9/2006 | Masters et al. | ........... 340/425.5 |
| 7,243,007 | B2 * | 7/2007 | Wilson et al. | ................... 701/2 |
| 7,315,780 | B2 * | 1/2008 | Sugahara et al. | ............ 701/200 |
| 2004/0006479 | A1 * | 1/2004 | Tanaka | ........................ 704/275 |
| 2004/0090314 | A1 * | 5/2004 | Iwamoto | .................. 340/425.5 |
| 2004/0204845 | A1 * | 10/2004 | Wong | ........................... 701/210 |
| 2005/0189159 | A1 * | 9/2005 | Weber et al. | ................. 180/315 |
| 2006/0149466 | A1 * | 7/2006 | Kikuchi et al. | ............... 701/211 |
| 2007/0043503 | A1 * | 2/2007 | Oesterling et al. | ........... 701/211 |

FOREIGN PATENT DOCUMENTS

| JP | A-2000-155893 | 6/2000 |
|---|---|---|
| JP | A-2000-221051 | 8/2000 |
| JP | A-2004-170359 | 6/2004 |

* cited by examiner

*Primary Examiner*—Khoi Tran
*Assistant Examiner*—Nicholas Kiswanto
(74) *Attorney, Agent, or Firm*—Posz Law Group, PLC

(57) ABSTRACT

A remote control device in a vehicle is provided in proximity of a driver's seat such that an operation unit of the remote control device is manually rotated and pressed by a hand of a driver in a driver's seat. A case of the remote control device contains vibrators to vibrate left and right sides of the remote control device. A navigation device is connected to a control unit of the remote control device. When a position of the vehicle approaches a specified guidance point during route guidance, the navigation device outputs a guidance signal (left-turn or right-turn instruction) to the control unit. When supplied with the guidance signal, the control unit controls driving of the vibrators to vibrate the remote control device based on the guidance signal.

11 Claims, 3 Drawing Sheets

CAR NAVIGATION SYSTEM

CROSS REFERENCE TO RELATED APPLICATION

This application is based on and incorporates herein by reference Japanese Patent Application No. 2005-353597 filed on Dec. 7, 2005.

FIELD OF THE INVENTION

The present invention relates to a car navigation system that is mounted in a vehicle and has a location function to detect vehicle positions and a route guidance function to indicate a route to a destination.

BACKGROUND OF THE INVENTION

Generally, a vehicle-mounted car navigation system has a route guidance function. During the route guidance, let us suppose that a vehicle position approaches a specified guidance point such as an intersection for right or left turn or an entry to or an exit from an express highway. In such case, a screen display on a display device changes to an enlarged map near the intersection. In addition, the system provides voice guidance such as "turn to the left 300 m ahead" or "turn to the left ahead."

Such voice guidance is effective because it enables the guidance without necessitating a driver to view the display screen. On the other hand, the driver (or passenger) may hardly hear the voice guidance due to sounds outside the vehicle (e.g., the other vehicle's horn sound). Reversely, the guidance voice may make it difficult to hear sounds outside the vehicle. A fellow passenger may feel the guidance voice annoying while he or she is sleeping or listening to the music.

In recent years, several techniques are proposed to provide the driver with more easily recognizable guidance at guidance points. The techniques aim at attaching a vibrating body to a driver's seat or a steering wheel to transmit vibration to the driver's body (back or hands) for providing the guidance (e.g., see patent documents 1, 2, and 3).

Patent document 1: JP-2000-221051A
Patent document 2: JP-2000-155893A
Patent document 3: JP-2004-170359A When the driver's seat or the steering wheel is vibrated as mentioned above, however, the seat or the steering wheel needs to contain the vibrating body and special wiring. The device becomes large-scale, requires complicated installation works, and greatly increases costs. Vibrating the seat or steering wheel makes it difficult for the driver to determine whether the guidance instructs the driver to turn to the left or right. Further, some drivers may be surprised or displeased at sudden vibration.

SUMMARY OF THE INVENTION

The present invention has been made in consideration of the foregoing. It is therefore an object of the present invention to provide a car navigation system that can notify a driver of approach to a specified guidance point during route guidance in an easily recognizable manner and can be provided in a relatively simple construction for this purpose.

In recent years, there is an increasing demand for providing a vehicle (automobile) with a remote control device called a haptic device. The single remote control device enables operations of various vehicle-mounted devices such as a car navigation system, car audio, air conditioner, electrically operated mirror, and direction indicator. The remote control device is equipped with an operation unit. Examples of the operation unit include a hemispheric operation unit called a trackball capable of rotary and pressing operations, a control knob inclinable in all directions, and a dial capable of rotary and pressing operations. For example, the remote control device is disposed at the left of the driver's seat (near the shift lever in a right-hand-drive car) or a similar place where the driver can easily operate the remote control device at hand without extending his or her arm. To complete the invention, the inventors gave attention to such remote control device and confirmed that the use of the remote control device can solve the above-mentioned problem.

According to an aspect of the present invention, a navigation system in a vehicle is provided as follows. A location function is included to detect a vehicle position of the vehicle. A route guidance function is included to indicate a route to a destination. A remote control device is included to allow a driver to manually input an instruction for a vehicle-mounted device. A vibration guiding unit is included to provide guidance by vibrating the remote control device when the vehicle position approaches a guidance point during execution of the route guidance function.

According to the invention, the vibration guiding unit vibrates the remote control device when the vehicle position approaches a guidance point during execution of the route guidance function. The driver feels the vibration while touching the remote control device by hand and can tactually recognize that the vehicle approaches the guidance point. In this case, the notification is made not through the sense of sight or hearing, but through such a manner more easily recognizable to the driver as to directly apply vibration to the body. The driver can be easily notified that the vehicle approaches the specified guidance point. Since the remote control device is provided originally for operations of the vehicle-mounted devices, the remote control device can be relatively simply constructed without the need to add a large-scale device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
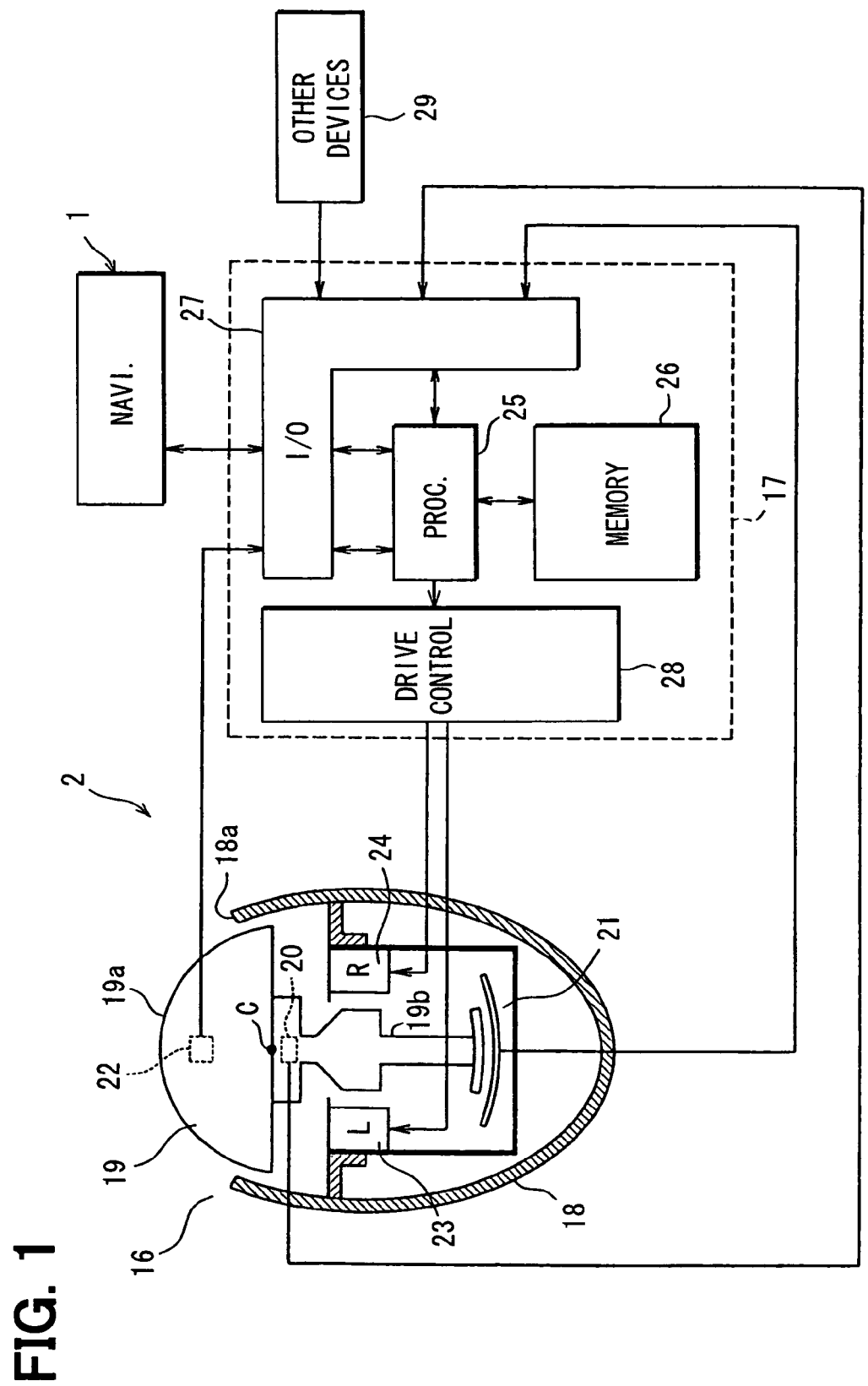
FIG. 1 schematically shows a construction of a remote control device as an example according to an embodiment of the invention.

A car navigation system as an example of an embodiment of the invention will be described with reference to FIGS. 1 through 4. The car navigation system is built into a vehicle (automobile). The car navigation system includes a car navigation device 1 (see FIGS. 1 and 3) and a remote control device 2 (see FIGS. 1 through 3) called a haptic device. Referring now to FIG. 3, the car navigation device 1 will be described concisely.

FIG. 3 schematically shows an electric construction of the car navigation device 1. The car navigation device 1 has a control circuit 3 mainly including a microcomputer composed of a known CPU, ROM, RAM, I/O, and the like. The control circuit 3 connects with a position detector 4, a map data input device 5, an operation switch group 6, an external memory 7, a display device 8, a voice output device 9, and a communication device 10. The position detector 4 detects a position (or current position) of the vehicle. The display device 8 represents a color liquid crystal display for example and is placed on an interior instrument panel. The voice output device 9 provides voice output means. The communication device 10 enables communication with an external information center and the like. Further, the control circuit 3 connects with a car audio device 11 and the remote control device 2.

The position detector 4 includes a G sensor 12, a gyro sensor 13, a distance sensor 14, and GPS receiver 15. The control circuit 3 uses inputs from the sensors 12 through 15 of the position detector 4 to highly accurately detect the vehicle's current place, traveling direction, speed, mileage, current time, and the like.

The map data input device 5 is composed of a drive unit to read various data such as road map data and associated facility data (destination data) from a map data recording medium that records those data. The map recording medium represents a large-capacity storage medium such as DVD or CD-ROM. The road map data contains not only such data as road shape, road width, road name, traffic light, railroad crossing, building, various facilities, place name, and landform, but also data for reproducing the road map on a screen of the display device 8.

The facility data is composed of information about transport facilities such as railway stations, facilities such as leisure facilities, lodging facilities, and public facilities, various stores such as retail stores, department stores, and restaurants, homes and condominium buildings, and place names. The facility data contains associated telephone numbers and addresses and the other data such as latitudes and longitudes. The facility data further contains data for overlaying a landmark or the like indicating a facility on the road map displayed on the screen of the display device 8.

Though not shown in detail, the operation switch group 6 is composed of a mechanical switch provided near the screen of the display device 8 and a touch panel provided on the screen of the display device 8. Using the operation switch group 6, a driver (user) can perform various input operations such as executing various functions, specifying destinations, and selecting scale ratios of a road map displayed on the display device 8. As will be described later, the remote control device 2 is also capable of the above-mentioned various input operations.

The display device 8 is composed of a color liquid crystal display for example and is provided on an interior instrument panel. Normally, the screen of the display device 8 displays a map around the vehicle's current position with various scales. The displayed map is overlaid with a current position mark that indicates the vehicle's current position and traveling direction. During the route guidance to a destination, the display device 8 displays a screen for route guidance. The display device 8 also displays not only screens for a user to enter various items such as destinations and settings (selections), but also various messages.

According to software construction (program execution), the control circuit 3 implements the location function to find the vehicle's current position. In addition, the control circuit 3 implements the route guidance function that retrieves and indicates a route to the specified destination.

As mentioned above, the location function allows the display device 8 to display a road map based on the map data from the map data input device 5. Based on the detection by position detector 4, the location function also displays a current position mark that indicates the vehicle's current position and traveling direction. In this case, the display of the current position moves as the vehicle travels. The map scrolls in synchronization with the vehicle position. At this time, map matching is performed to place the vehicle's current position on a road.

The route guidance function uses, for example, the known Dijkstra algorithm to automatically calculate a recommended traveling route from the vehicle start point (current position) to a user-specified destination. In this manner, the route guidance function indicates the route to the specified destination. During the route guidance, the screen of the display device 8 superimposes a route to be traveled in a remarkable color on the road map. The route is displayed together with the vehicle's current position (current position mark).

During the route guidance, let us suppose that the vehicle (or the vehicle position) approaches a specified guidance point such as an intersection to turn to the right or left, a fork, or an entry to or an exit from an express highway. In this case, the screen of the display device 8 changes to an enlarged map (on two screens) near the intersection. As will be described later, the remote control device 2 also provides the guidance by vibration. Again, as will be described later, the voice guidance is also performed when it is active. For example, the voice output device 9 provides the voice guidance such as "turn the intersection 300 m ahead to the left." The guidance also includes a notification of a lane to choose from two or more lanes per one direction and a previous notice about a railroad crossing or a curve ahead.

Figure 2:
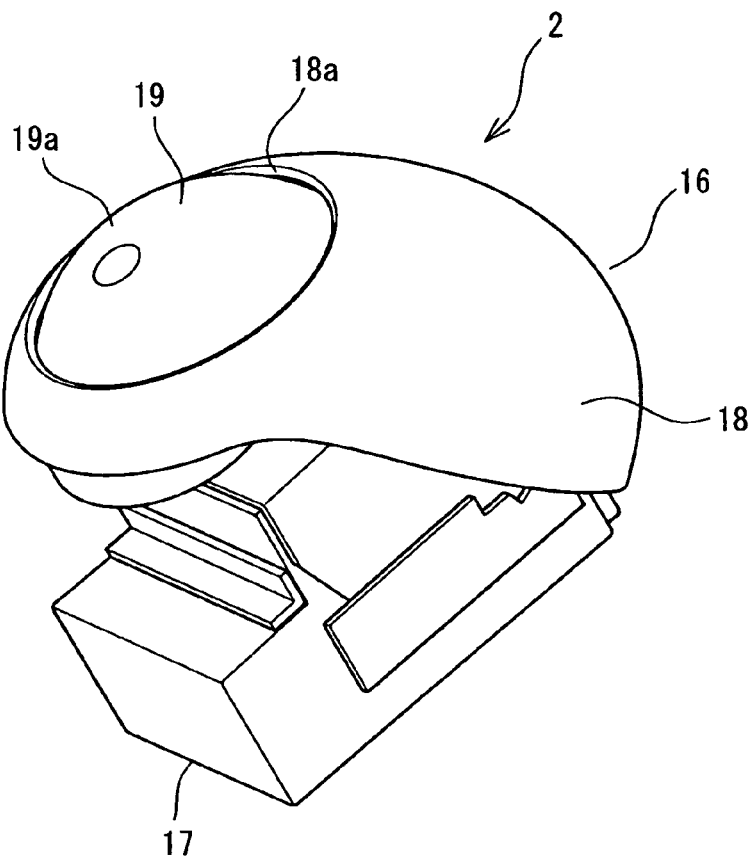
FIG. 2 is a perspective view of the remote control device.
Figure 3:
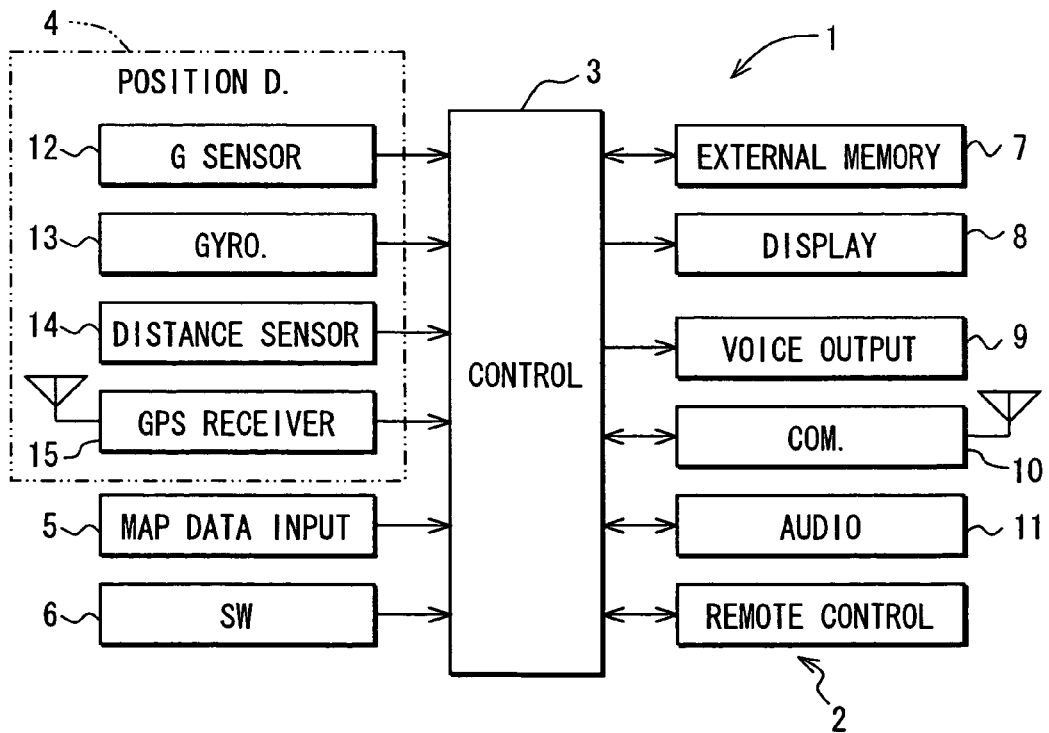
FIG. 3 is a block diagram schematically showing an electric construction of a car navigation device.

With reference to FIGS. 1 and 2, the following describes a construction of the remote control device 2. The remote control device 2 is composed of a device body 16 called a trackball and a control unit 17 provided under the device body 16. Though not shown, the remote control device 2 (device body 16) is placed in proximity of a driver's seat to be manually operated by a hand of the driver seated in the driver's seat, for example, between a shift lever and a console box. That is, the place is properly selected to the left of a driver's seat where the driver in a right-hand-drive car can operate the remote control device 2 with his or her left hand (at a place where the driver can easily operate the remote control device 2 at hand while watching forward).

The device body 16 is almost spherical. The device body 16 has a case 18 whose top has a circular opening 18a. The case contains an operation unit 19 the user (driver) operates. The operation unit 19 has a hemispheric operation surface 19a that is positioned so as to face the opening 18a. The operation unit 19 is formed together with an arm unit 19b that extends downward from the operation surface 19a. Though not shown in detail, the operation unit 19 is supported around center C (see FIG. 1) of a hemisphere formed by the operation surface 19a so as to be rotative in all directions. In addition, the operation unit 19 can be pressed downward.

As shown in FIG. 1, the case 18 contains a switch 20 that operates when the operation unit 19 is pressed downward. The case 18 also contains an operation position detector 21 to generate a position signal that indicates the position of a tip of the arm unit 19b (consequently the operating position of the operation unit 19). A touch switch 22 is provided as detection means for detecting that the driver touches the operation unit 19 (operation surface 19a). Though not shown, an actuator is provided to apply kinesthetic sense in any directions to the operation unit 19 while it operates. The operation unit 19 uses a spring (not shown) to automatically return the operation surface 19*a*, when not operated, to a home position, i.e., the center of the opening 18*a*.

As shown in FIG. 1, the case 18 contains vibrators 23 and 24 to vibrate the device body 16. The embodiment provides two vibrators, i.e., a left vibrator 23 and a right vibrator 24. The left vibrator 23 vibrates around the left side of the case 18. The right vibrator 24 vibrates around the right side of the case 18. As will be described later, the vibrators 23 and 24 as well as the control unit 17 function as vibration guiding means for providing the route guidance by means of vibration.

As shown in FIG. 1, the control unit 17 has an arithmetic processing unit 25 mainly composed of a microcomputer (CPU). The control unit 17 also includes a memory unit 26 connected to the arithmetic processing unit 25, an input/output interface 27, a drive control unit 28 for driving and controlling the vibrators 23 and 24, and a control output unit (not shown) for controlling the actuator. The drive control unit 28 can also control the vibration intensity and frequencies of the vibrators 23 and 24.

The input/output interface 27 connects with the switch 20, the operation position detector 21, and the touch switch 22, and is supplied with signals from these components. Further, the input/output interface 27 connects with the car navigation device 1 and the other vehicle-mounted devices 29 such as an air conditioner, electrically operated mirror, and direction indicator. The memory unit 26 stores a program to control the remote control device 2, and various necessary data.

The arithmetic processing unit 25 is supplied with (i) input signals from the switch 20, the operation position detector 21, and the touch switch 22, (ii) data stored in the memory unit 26, and (iii) instructions from a predetermined program, for example. Based on the supplied information, the arithmetic processing unit 25 outputs a control signal corresponding to operations of the operation unit 19, i.e., a signal to control operations of the vehicle-mounted device to be operated. The control signal is output to the car navigation device 1, the car audio device 11, and the other vehicle-mounted devices 29 via the input/output interface 27.

In this manner, the driver can rotate or press the operation unit 19 of the remote control device 2 with his or her left hand to manually operate various vehicle-mounted devices including the car navigation device 1. At this time, the arithmetic processing unit 25 controls the actuator to change the sense (tactile sense) of operating the operation unit 19 depending on devices to be operated. Each device is supplied with specific operability.

During the route guidance, the vehicle position may approach a specified guidance point, especially an intersection or a fork to turn to the left or right. In this case, the car navigation device 1 (control circuit 3) supplies an appropriate guidance signal (left-turn or right-turn instruction) to the control unit 17 of the remote control device 2. The car navigation device 1 (control circuit 3) outputs the guidance signal for the left-turn or right-turn instruction at specified time intervals three times, e.g., when the vehicle position reaches 700 m and 300 m short of the intersection, and immediately before it.

During the route guidance, the control unit 17 of the remote control device 2 may supply a signal to stop the voice guidance. In this case, the car navigation device 1 (control circuit 3) stops the voice guidance using the voice output device 9. This will be described later in more detail. When the control unit 17 supplies a signal to release the stopped voice guidance, the car navigation device 1 (control circuit 3) restarts (resumes) the voice guidance using the voice output device 9. In this manner, stop means is provided.

As will be described later with reference to a flowchart, the control unit 17 (arithmetic processing unit 25) of the remote control device 2 may be supplied with the guidance signal (left-turn or right-turn instruction) according to the software architecture (program execution) during the route guidance. In this case, the control unit 17 (arithmetic processing unit 25) allows the drive control unit 28 to control driving of the vibrators 23 and 24 and vibrate the remote control device 2 (device body 16) for guidance. In this manner, the vibration guiding means is provided.

When the guidance signal corresponds to the left-turn instruction, the control unit 17 vibrates the left vibrator 23 to mainly vibrate the left part of the remote control device 2. When the guidance signal corresponds to the right-turn instruction, the control unit 17 vibrates the right vibrator 24 to mainly vibrate the right part of the remote control device 2. Further, driving of the vibrators 23 and 24 is controlled as follows. The vibrators relatively weakly vibrate when the vehicle is far from (700 m short of) the guidance point. The vibrators gradually increase the vibration intensity as the vehicle approaches the guidance point. The driving of the vibrators 23 and 24 is controlled while the guidance signal is supplied.

Further, the control unit 17 checks the touch switch 22 during the route guidance to detect whether or not the driver touches the operation unit 19 of the remote control device 2. When detecting that the driver touches the operation unit 19, the control unit 17 supplies a voice guidance stop signal to the car navigation device 1 (control circuit 3). When detecting subsequently that the driver releases his or her hand from the operation unit 19, the control unit 17 supplies a release signal to release the stopped voice guidance.

After the operation unit 19 provides the above-mentioned guidance by means of vibration, the control unit 17 determines whether or not the driver responds to press the operation unit 19 (whether or not the switch 20 is turned on). When no response operation occurs within a specified time period, for example, the control unit 17 supplies the car navigation device 1 with the release signal to release the stopped voice guidance. When a response operation occurs, the voice guidance remains inactive.

The above-mentioned operation will be described with reference to FIG. 4, too. The car navigation device 1 performs the route guidance as follows. The user (driver) operates the operation switch group 6 (or the remote control device 2) of the car navigation device 1 to activate the route guidance function. The user can then specify a destination. The car navigation device 1 then retrieves (calculates) a recommended route from the starting place (current position) to the specified destination and then starts the route guidance. The control unit 17 of the remote control device 2 is supplied with a signal indicating that the route guidance function takes effect.

Figure 4:
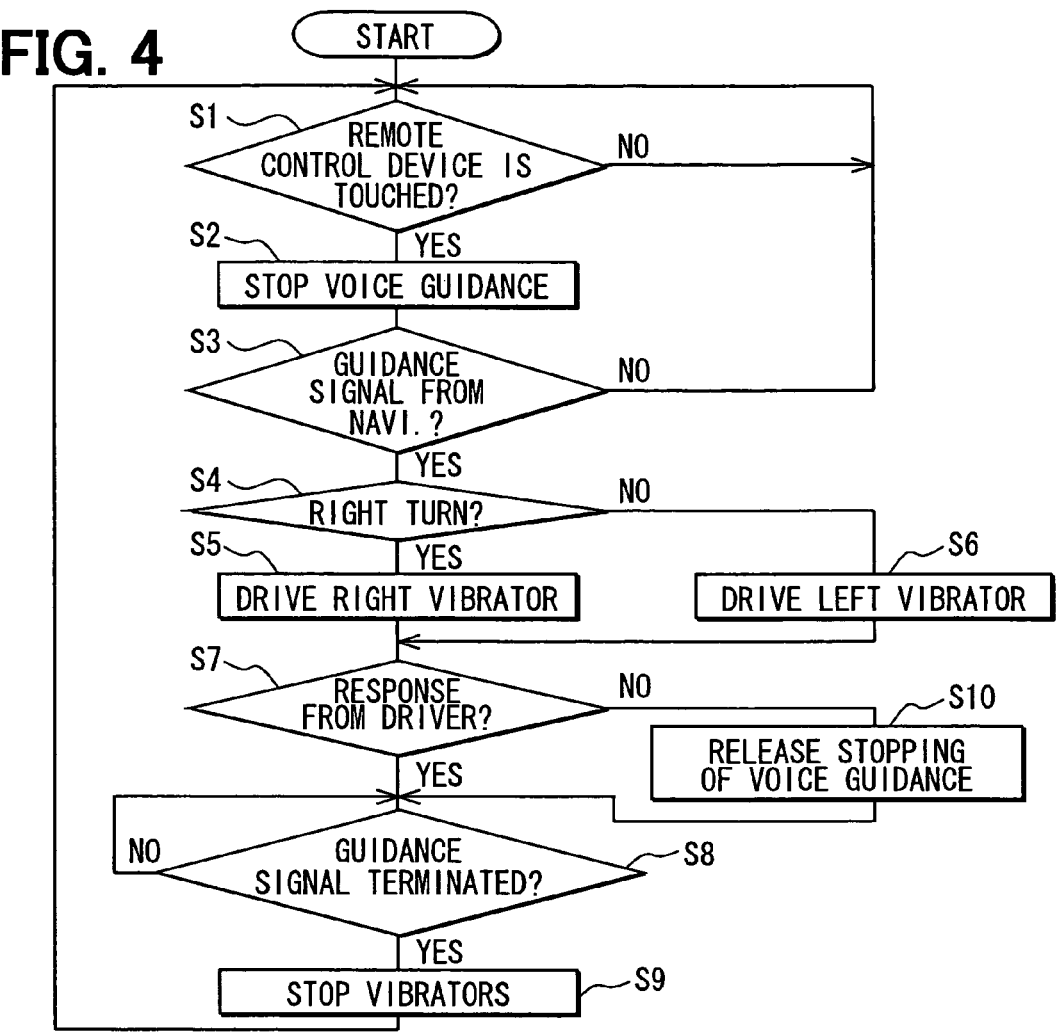
FIG. 4 is a flowchart showing a process performed by a control unit of the remote control device during route guidance.

The flowchart in FIG. 4 schematically shows a process preformed by the control unit 17 (arithmetic processing unit 25) of the remote control device 2 when the car navigation device 1 performs the route guidance. At Step S1, the process checks a signal from the touch switch 22 to determine whether or not the driver touches (or places his or her palm on) the remote control device 2 (operation unit 19).

When it is determined that the driver touches the remote control device 2 (Yes at Step S1), the process proceeds to Step S2. At Step S2, the process supplies the car navigation device 1 with a signal to stop the voice guidance and proceeds to Step S3. At this time, the car navigation device 1 stops the voice guidance. When it is determined that the driver does not touch the remote control device 2 (No at Step S1), the process returns to Step S1 until otherwise determined. When the driver does not touch the remote control device 2, the car navigation device 1 performs the voice guidance to inactivate the guidance by means of vibration described below.

At Step S3, the process determines whether or not the guidance signal is supplied from the car navigation device 1. The car navigation device 1 supplies the guidance signal when the vehicle position approaches a specified guidance point, e.g., an intersection to turn to the left or right, 700 m and 300 m short of the intersection, and immediately before it. The car navigation device 1 supplies the control unit 17 of the remote control device 2 with the appropriate guidance signal for the left-turn or right-turn instruction. When no guidance signal is supplied from the car navigation device 1 (No at Step S3), the process returns to Step S1.

When the guidance signal is supplied from the car navigation device 1 (Yes at Step S3), the process proceeds to Step S4. When the guidance signal specifies the right-turn instruction (Yes at Step S4), the process controls the right vibrator 24 for vibration at Step S5. When the guidance signal specifies the left-turn instruction (No at Step S4), the process controls the left vibrator 23 for vibration at Step S6. Though not detailed in the flowchart, the vibrators 23 and 24 are controlled for driving as mentioned above so as to relatively weakly vibrate far from (700 short of) the guidance point and gradually increase the vibration intensity as the vehicle approaches the guidance point.

At Step S7, it is determined whether or not the switch 20 is turned on, i.e., the driver presses the operation unit 19 of the remote control device 2, during the vibration guidance. When the switch 20 is turned on, i.e., the driver performs a response operation, during the vibration guidance (Yes at Step S7), the process waits until the guidance signal from the car navigation device 1 terminates (step S8). When the guidance signal terminates (Yes at Step S8), the process stops driving the vibrators 23 and 24 at Step S9.

When the switch 20 is not turned on, i.e., the driver does not press the operation unit 19 (No at Step S7), during the vibration guidance, the process proceeds to Step S10. At Step S10, the process supplies the car navigation device 1 with a release signal to release the stopped voice guidance. In this case, the car navigation device 1 resumes a mode to perform the voice guidance.

When the vehicle position approaches the guidance point during execution of the route guidance function, the above-mentioned process provides the guidance to turn to the right or left through vibration of the remote control device 2 for the driver who touches the remote control device 2 (device body 16) with his or her left hand. The driver feels the vibration of the remote control device 2 to tactually recognize that the vehicle approaches the guidance point. In this case, the notification is made not through the sense of sight or hearing, but through such a manner more easily recognizable to the driver as to directly apply vibration to the body. The driver can be easily and safely notified that the vehicle approaches the specified guidance point.

When the left-turn instruction is issued, the left vibrator 23 is driven to vibrate the left part of the remote control device 2. When the right-turn instruction is issued, the right vibrator 24 is driven to vibrate the right part of the remote control device 2. The driver can easily understand the instruction to turn to the left or right. It is possible to more easily indicate the left or right turn. Further, the vibration intensity varies with a distance between the vehicle position and the intersection or the like to turn to the right or left. The driver can be collaterally notified of information about the distance to the intersection or the like to turn to the right or left by means of intensity of the vibration the driver feels. It is possible to notify whether the vehicle is sufficiently far from or very nearly approaches the intersection or the like to turn to the right or left.

The touch switch 22 detects whether or not the driver touches the remote control device 2. When the driver touches the remote control device 2, the voice output device 9 stops the voice guidance. After the guidance by means of vibration, the driver may operate the remote control device 2 as a response. In this case, the voice guidance remains inactive. When no response operation occurs, the embodiment restarts the voice guidance assuming that the driver does not recognize the guidance by means of vibration. As a result, more reliable guidance is available.

In other words, this construction enables the driver to choose whether or not to use the voice guidance. It is desirable to disable the voice guidance, for example, when the driver wishes not to disturb a sleeping passenger, to enjoy music and the like using the car audio device 11 in a silent environment, or to pay attention to other vehicles' sounds in heavy traffic. In such case, the driver only needs to place his or her hand on the remote control device 2 and respond to the vibration guidance when it occurs.

On the other hand, the voice guidance is convenient for a relatively complicated intersection with many forking roads, a road with successive right and left turns at short intervals, and the like. In this case, the driver can activate the voice guidance by not touching the remote control device 2 or not responding to the vibration guidance when provided.

In this manner, vibration of the remote control device 2 is used to easily notify a driver that the vehicle approaches a specified guidance point during the route guidance. Since the remote control device 2 is provided originally for operations of the vehicle-mounted devices, the remote control device 2 can be relatively simply and less costly constructed. The remote control device 2 does not need to add a large-scale device differently from a well-known technique that mounts a seat or a steering wheel with a vibrator and its special wiring.

Though not detailed in the above-mentioned example, the vibrators 23 and 24 built into the remote control device 2 can be also used for the other purposes than the vibration guidance during the route guidance. Driving the vibrators 23 and 24 vibrates the remote control device 2 to be able to notify, for example, that the up-to-date traffic information is received from a local traffic information center, that a distance between the vehicle and another vehicle ahead becomes short, and that the vehicle is approaching a dangerous area. The remote control device 2 can be used to notify an error in operating vehicle-mounted devices by means of vibration. In this manner, the vibration of the remote control device 2 can be used for many purposes.

Figure 5:
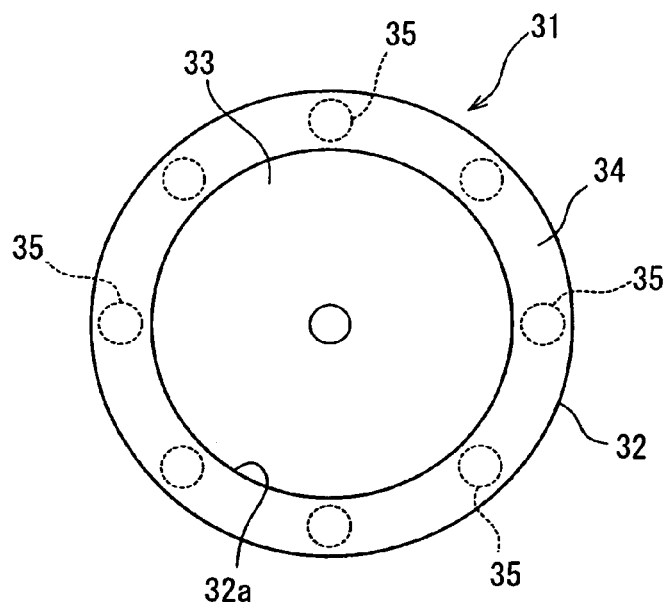
FIG. 5 is a top view of the remote control device as an example according to another embodiment of the invention.

FIG. 5 shows a remote control device 31 (device body) as an example according to another embodiment of the invention. Similarly to the above-mentioned remote control device 2 (device body 16), the remote control device 31 is composed of an operation unit 33 housed in an approximately spheric case 32 whose top has a circular opening 32*a*. The operation unit 33 can be rotated and pressed. The remote control device 31 is provided with an illuminating unit 34 the driver can visually check.

The illuminating unit 34 uses translucent (half transparent) material around the opening 32*a* in the case 32. The inside of the case 32 is provided with multiple (e.g., eight) LEDs 35 that are disposed at regular intervals all around the opening 32*a*. For example, the LED 35 uses a 2-color light-emitting diode capable of switching between blue and red lights. The control unit 17 controls the LEDs 35 for lighting.

When the car navigation device 1 supplies the guidance signal (left-turn or right-turn instruction) during the route guidance according to the above-mentioned construction, the control unit 17 controls driving of the vibrators 23 and 24 to vibrate the remote control device 2 (device body 16). In addition, the control unit 17 turns on the LED 35 to activate the illuminating unit 34 for guidance. In this case, for example, the illuminating unit 34 lights in red for right turn or in blue for left turn. This makes it possible to distinguish between the right-turn and left-turn information. In this manner, the driver can be also visually notified that the vehicle approaches a guidance point. The more easily recognizable guidance is available.

The above-mentioned embodiment provides the vibrators 23 and 24 to the left and right sides of the remote control device 2 (device body 16). Further, it is possible to provide one vibrator and vary vibrational frequencies to generate the left-turn and right-turn instructions. In this manner, the driver can feel large and small (or high and low) vibrational frequencies of the remote control device 2 and easily recognize the left-turn and right-turn instructions. It is likewise possible to easily indicate the left turn and the right turn. Since one vibration generating source is used, the remote control device 2 can be more simple and less costly.

Further, it is possible to change construction of the remote control device and its installation position. In this case, available remote control devices (haptic devices) use the operation unit such as a control knob (joystick) rotatable in all directions or a dial that can be rotated and pressed. Such remote control devices can be also used.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system that is provided in a vehicle and has a location function to detect a vehicle position of the vehicle and a route guidance function to indicate a route to a destination, the system comprising:
   a remote control device that allows a driver to manually input an instruction for a vehicle-mounted device;
   a vibration guiding unit that provides guidance by vibrating the remote control device when the vehicle position approaches a guidance point during execution of the route guidance function;
   a voice output unit that performs voice guidance during execution of the route guidance function when the vehicle position approaches the guidance point;
   a detection unit that detects whether or not the driver touches the remote control device; and
   a stop unit that stops the voice guidance using the voice output unit for the entire duration that the detection unit detects that the driver is touching the remote control device, and thereafter releases the stopped voice guidance when the detection unit detects that the driver is not touching the remote control device.

2. The navigation system according to claim 1, wherein the remote control device is disposed in proximity of a driver's seat and has an operation unit that is to be rotated and pressed by a hand of the driver seated in the driver's seat.

3. The navigation system according to claim 1, wherein a state, where voice guidance is stopped by the stop unit, is released when the remote control device is vibrated for guidance and the driver does not operate the remote control device as a response.

4. The navigation system according to claim 1, wherein the vibration guiding unit vibrates a left portion or a right portion of the remote control device to provide a left-turn instruction or a right-turn instruction, respectively.

5. The navigation system according to claim 1, wherein the vibration guiding unit uses two mutually different vibrational frequencies for the remote control device to provide a left-turn instruction and a right-turn instruction, respectively.

6. The navigation system according to claim 1, wherein the vibration guiding unit varies vibration intensities of the remote control device depending on a distance between the vehicle position and the guidance point.

7. The navigation system according to claim 1, wherein the remote control device includes an illuminating unit that is visually recognized by the driver, and
wherein the vibration guiding unit provides guidance by vibrating the remote control device and activating the illuminating unit.

8. A navigation system in a vehicle, the system comprising:
   location means for detecting a vehicle position of the vehicle;
   route guidance means for indicating a route to a destination;
   remote control means for allowing a driver to manually input an instruction for a vehicle-mounted device;
   vibration guiding means for providing guidance by vibrating the remote control means when the vehicle position approaches a guidance point while the route is indicated;
   voice output means for performing voice guidance during execution of a route guidance function when the vehicle position approaches the guidance point;
   detection means for detecting whether or not the driver touches the remote control means; and
   stop means for stopping the voice guidance using the voice output means for the entire duration that the detection means detects that the driver is touching the remote control means, and thereafter releasing the stopped voice guidance when the detection unit detects that the driver is not touching the remote control device.

9. A navigation system that is provided in a vehicle and has a location function to detect a vehicle position of the vehicle and a route guidance function to indicate a route to a destination, the system comprising:
   a remote control device that allows a driver to manually input an instruction for a vehicle-mounted device;
   an illuminating unit that is visually recognized by the driver;
   a vibration guiding unit that provides, when the vehicle position approaches a guidance point during execution of the route guidance function, guidance by (i) vibrating the remote control device and, in addition, (ii) causing the illuminating unit to emit light;

a voice output unit that performs voice guidance during execution of the route guidance function when the vehicle position approaches the guidance point;

a detection unit that detects whether or not the driver touches the remote control device; and a stop unit that stops the voice guidance using the voice output unit for the entire duration that the detection unit detects that the driver is touching the remote control device, and thereafter releases the stopped voice guidance when the detection unit detects that the driver is not touching the remote control device.

10. The navigation system of claim 9, wherein
the vibration guiding unit causes the illuminating unit to differentiate a pattern for emitting light with respect to each of the left-turn instruction and the right-turn instruction.

11. The navigation system of claim 10, wherein
the vibration guiding unit causes the illuminating unit to differentiate a color of the emitted light with respect to each of the left-turn instruction and the right-turn instruction.

* * * * *